United States Patent
Kamioka et al.

(10) Patent No.: US 8,805,580 B2
(45) Date of Patent: Aug. 12, 2014

(54) ROBOT AND CONTROL SYSTEM

(75) Inventors: Takumi Kamioka, Wako (JP);
Masanori Takeda, Wako (JP);
Mitsuhide Kuroda, Wako (JP); Shigeru Kanzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 583 days.

(21) Appl. No.: 13/084,961

(22) Filed: Apr. 12, 2011

(65) Prior Publication Data

US 2011/0264263 A1 Oct. 27, 2011

(30) Foreign Application Priority Data

Apr. 22, 2010 (JP) ................................ 2010-098963

(51) Int. Cl.
*G06F 19/00* (2011.01)
*B62D 57/032* (2006.01)
*B25J 9/16* (2006.01)

(52) U.S. Cl.
CPC ............. *B62D 57/032* (2013.01); *B25J 9/1602* (2013.01); *Y10S 901/01* (2013.01)
USPC .............................................. 700/245; 901/1

(58) Field of Classification Search
USPC ................................ 700/245–264, 300–302; 318/568.1–568.25; 901/1, 48–50
See application file for complete search history.

(56) References Cited

U.S. PATENT DOCUMENTS

2007/0299559 A1* 12/2007 Janssen et al. ................ 700/259
2008/0065269 A1* 3/2008 Hasegawa ..................... 700/260
2009/0254217 A1* 10/2009 Pack et al. ..................... 700/246

FOREIGN PATENT DOCUMENTS

JP 2004-306231 11/2004
JP 2006-088331 4/2006

* cited by examiner

*Primary Examiner* — Khoi Tran
*Assistant Examiner* — Abby Lin
(74) *Attorney, Agent, or Firm* — Rankin, Hill & Clark LLP (57) ABSTRACT

Provided is a control system and the like capable of deriving at high speed a solution to the optimization problem of combinations of continuous state variable and discrete state variables. According to the control system, by setting a search range (first search range) of internal action candidates $a_{i1}$ for an internal module mod1 smaller than a search range (second search range) of external action candidates $a_{i2}$ for a low-frequency external module mod2, the arithmetic computing speed is accelerated accordingly. Thereby, when it is necessary for a robot R to cope with a disturbance emergently on the basis of measured state values of the robot R, the operation of robot R can be controlled according to the arithmetic computing result from the high-frequency internal module mod1 without waiting for the arithmetic computing result form the low-frequency external module mod2.

8 Claims, 9 Drawing Sheets

(W : WALKING)

FIG.5 (b)

(R : RUNNING)

FIG.5 (c)

(S : ONE-FOOT SPRING)

ROBOT AND CONTROL SYSTEM

BACKGROUND OF THE INVENTION

1. Field of the Invention

The present invention relates to a control system and a robot serving as a control subject of the control system.

2. Description of the Related Art

The control of a robot having multiple degrees of freedom is a problem of determining at real time multi-dimensional control inputs satisfying multiple restrictions. Conventionally, the problem is degraded to linear problems, and the robot is controlled according to combinations of the linear problems. In recent years, in order to make the robot fulfill more complicated motions, there has been disclosed an approach for determining control variables by formulating the problem to a multi-objective optimization problem to derive solutions thereof directly (refer to Japanese Patent Laid-open No. 2004-306231).

The objective function of the optimization problem takes state vectors of the robot as input values and scalar values as output values. Due to the redundancy in the motions of the robot, the multiple objectives and the multiple restrictions are evaluated by the scalar values; therefore, it is difficult to define the objective function from a convex function to which the solutions can be solved easily. Thereby, the problem should be solved as a non-convex optimization problem generally solved by a search algorithm.

The robot needs to be controlled at real time. On the other hand, there is a trade-off between the maximization of the objective function and the derivation of solutions from the objective function in the optimization problem. Generally, operation time for deriving the solutions must be performed within a control cycle determined by a control objective and a control subject, it is expected to use a high-speed arithmetic processor or the like disposed outside the robot to speed up the arithmetic computation (refer to Japanese Patent Laid-open No. 2006-88331).

However, variables that must be determined for the motions of a robot, namely, the variables in the optimization problem includes not only continuous state variables such as instructions on landing positions for the robot and the like, but also limited discrete state variables such as flags for specifying the types of the motions such as walking, running and the like. The values of the objective function fluctuate discontinuously and greatly when the limited discrete state variables vary.

Thus, efficient search algorithms for determining a subsequent search point on the basis of evaluation values of solution candidates, such as evolutionary algorithm, simulated annealing and the like, cannot be employed. According thereto, only inefficient search approaches, such as full search, random search and the like can be employed to solve the optimization problem containing continuous values (real values) and discrete values. Thereby, it is difficult to derive at real time the solutions necessary for controlling the robot, and consequently, difficult to determine the motions of the robot.

Moreover, when the external arithmetic processor is employed, the control cycle may not be secured due to communication delay or the like. In the control of an inverted pendulum typed mobile object typified by a bipedal walking robot, the delay of the control cycle leads to an incorrigible state such as falling down or the like, thus, it is necessary to provide a system to compensate the communication delay.

SUMMARY OF THE INVENTION

The present invention has been accomplished in view of the aforementioned problems, and it is therefore an object of the present invention to provide a control system and the like capable of deriving at high speed a solution to a control problem defined by the optimization problem of combinations of continuous state variable and discrete state variables and capable of compensating communication delay.

To attain an object mentioned above, the present invention provides a control system provided with a control module configured to control an actuator being a power source for driving a control subject, a high-frequency internal module mounted in the control subject, and a low-frequency external module disposed outside the control subject, wherein the external module is configured to search from a second search range defined in external action candidates which are combinations of unit action behaviors of the control subject denoted by one or a plurality of continuous state variable values and one or a plurality of discrete state variable values on the basis of measured state values of the control subject, at least one external action candidate having a goodness of fit appropriate for a specified action objective of the external action candidates on the basis of a predicted state of the control subject denoted by the continuous state variable values as an external action plan; the internal module is configured to search from a first search range defined smaller than the second search range in internal action candidates which are combinations of unit action behaviors of the control subject denoted by one or a plurality of continuous state variable values and one or a plurality of discrete state variable values on the basis of the measured state values of the control subject, at least one internal action candidate having a goodness of fit appropriate for a specified action objective of the internal action candidates on the basis of the predicted state of the control subject denoted by the continuous state variable values as an internal action plan; and the control module is configured to control the operation of actuator according to the internal action plan determined by the internal module (First aspect).

According to the control system of the present invention, the internal module and the external module are configured respectively to execute an array processing which searches an action plan for the control subject having a goodness of fit appropriate for the specified action objective of each action candidate from a plurality of action candidates for the control subject denoted by one or a plurality of continuous state variable values and one or a plurality of discrete state variable values. Thus, each module is equivalent to an array processor. Since not only the computing performance of the internal module but also the computing performance of the external module are employed, it can be expected to reduce the arithmetic computing time for determining the internal action plan (derivation of solutions).

The search range (second search range) for the low-frequency external module to search the external action plan is set wider than the search range (first search range) for the high-frequency (the computation cycle thereof is shorter than the external module) internal module to search the internal action plan. As a result thereof, the external action plan having the goodness of fit for the specified action objective higher than the internal action plan searched by the internal module can be searched by the external module.

Accordingly, compared with the case where the internal action plan is determined as a solution by the internal module alone, the operation of control subject can be controlled under the optimum behavior in consideration of the specified action objective while reducing the arithmetic computing time for deriving the solution as mentioned above.

On the other hand, the operation of control subject can be controlled as long as the arithmetic computing result is acquired from the internal module. The search range (first search range) for the high-frequency (the computation cycle thereof is shorter than the external module) internal module to search the internal action plan is set smaller than the search range (second search range) for the low-frequency external module to search the external action plan, the arithmetic computing speed is accelerated accordingly.

Thereby, when it is necessary for the control subject to cope with a disturbance emergently on the basis of the measured state values of the control subject (the measured values of state variables denoting the state of the control subject by a measuring instrument), the operation of control subject can be controlled according to the arithmetic computing result from the high-frequency internal module without waiting for the arithmetic computing result form the low-frequency external module.

Thereby, it is possible to speed up deriving the internal action plan for the control subject as a result when the control subject has acted according to the action candidate and a solution to the optimization problem on the combinations of various types of the unit action behaviors constituting the action candidate. As a result thereof, the control subject can be controlled to act at an appropriate behavior for an arbitrary disturbance in consideration of the action objective of the control subject.

It is acceptable that the external module, in the determination of the external action plan denoted by the one or a plurality of continuous state variable values and one or a plurality of discrete state variable values, is configured to determine an optimum combination of the continuous state variable values with respect to the entire or partial discrete state variable values according to a search algorithm and adopt a combination of a discrete state variable value and a continuous state variable value having the best goodness of fit from the optimum combination of the continuous state variable values with respect to the entire or partial discrete state variable values as the optimum action plan (second aspect).

It is acceptable that the external module is configured to evaluate the sub goodness of fit for a sub action objective different from the specified action objective for each of the external action candidates, evaluate the composite goodness of fit so that the contribution from the goodness of fit is higher than the contribution from the sub goodness of fit, and determine the external action plan according to the evaluation result of the composite goodness of fit (third aspect).

It is acceptable that the external module is configured to evaluate the composite goodness of fit $f_1$ for each of the external action candidates according to an evaluation expression $f=e(e_{sub}+1)$ or $f=w_1e(w_2e_{sub}+1)$ (herein, $w_1=(w_2+1)^{-1}$) based on the goodness of fit e and the sub goodness of fit $e_{sub}$ (fourth aspect).

According to the control system of the configuration mentioned above, the external module prioritizes the specified action objective in consideration of the other action objective to search the external action candidates for the control subject. Moreover, for each of the external action candidates, the composite goodness of fit is evaluated so that the contribution from the goodness of fit for the specified action objective is higher than the contribution from the sub goodness of fit for the other action objective.

Accordingly, when a disturbance occurs, only the specified action objective acquired from the arithmetic computing result (the internal action plan) by the internal module having a fast response is fed back to the action behavior of the control subject at the first stage, it is expected to reduce instantly the influence from the disturbance. After time passes, the other action objective in addition to the specified action objective acquired from the arithmetic computing result (the external action plan) by the external module having a slow response is fed back to the action behavior of the control subject, it is expected to recover the action behavior of the control subject so as to satisfy the entire objectives. Thereby, the control subject can be controlled to act at an appropriate behavior for an arbitrary disturbance in consideration of the action objective of the control subject.

It is acceptable that the internal module and the external module are configured to search a gait of the control subject over a specified number of footsteps constituted by a specified combination of various types of the unit action behaviors such as walking, running and one-foot spring as the internal action candidate and the external action candidate, respectively, and the control subject is a robot configured to have a body and a plurality of legs extended from the body (fifth aspect).

It is acceptable that the internal module and the external module are configured to evaluate the goodness of fit with an action objective of stabilizing a posture of the robot as the specified action objective, respectively (sixth aspect).

According to the control system of the configuration mentioned above, while speeding up the derivation of solution to the combination optimization problem as aforementioned, the robot serving as the control subject can be controlled according to the optimum gait in consideration of the specified action objective among the gaits constituted by the combination of walking, running and one-foot spring.

The robot for attaining the mentioned object of the present invention is configured to have a body and a plurality of legs extended from the body and move by the operation of the plurality of legs. The robot of the present invention serves as a control subject is provided with the control module and the internal module constituting the control system of the fifth or the sixth aspect (seventh aspect).

According to the robot of the present invention, it is possible to speed up deriving the internal action plan for the control subject as a result when the robot serving as the control subject has acted according to the action candidate (denoted by the continuous state variable values) and a solution to the optimization problem on the combinations of various types of the unit action behaviors constituting the action candidate (denoted by the discrete state variable values). As a result thereof, the robot can be controlled to act at an appropriate behavior for an arbitrary disturbance in consideration of the action objective of the control subject.

DETAILED DESCRIPTION OF THE PREFERRED EMBODIMENTS

An embodiment of a control system and a control subject thereof according to the present invention will be described with reference to the drawings.

(Configuration of Robot)

First, the configuration of a robot as an embodiment of the present invention will be described.

Figure 1:
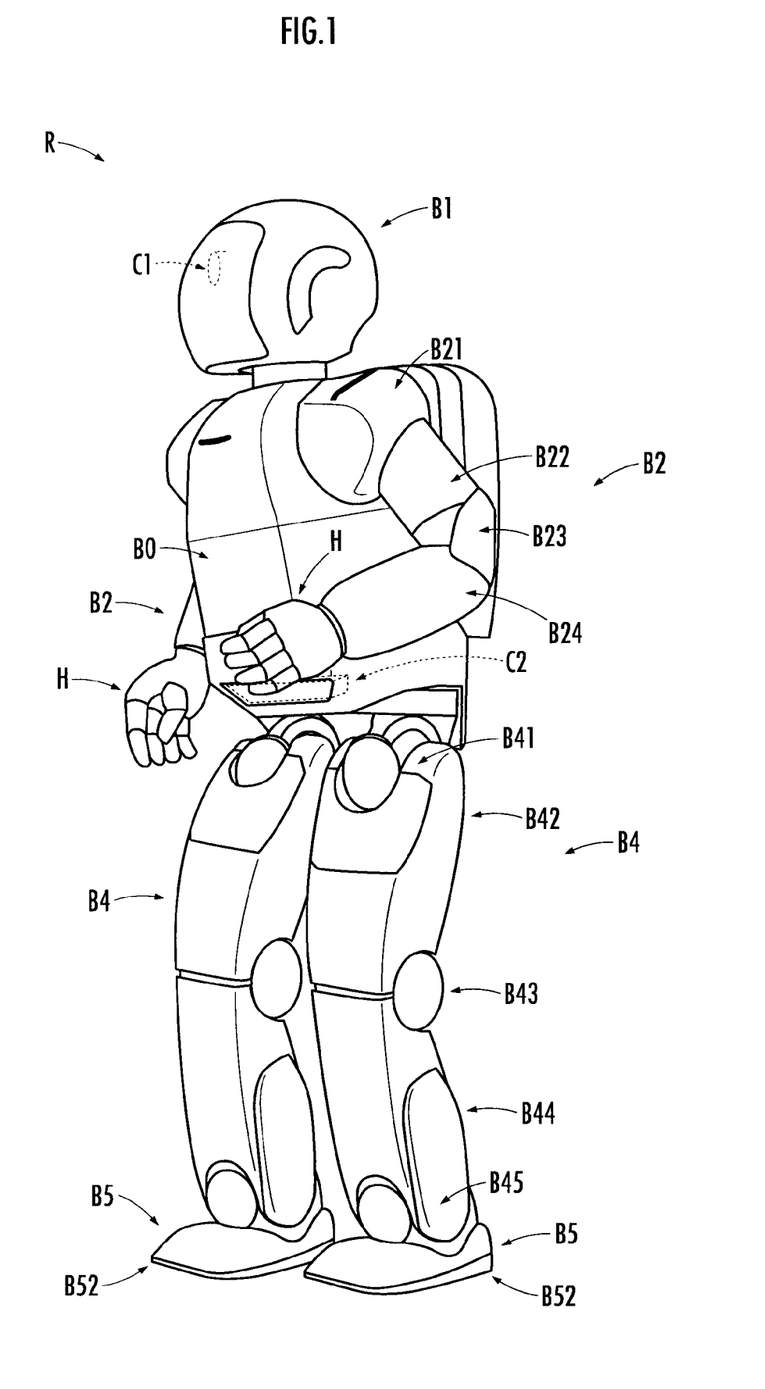
FIG. 1 is an explanatory view illustrating a configuration of a robot according to an embodiment of the present invention.

The robot R illustrated in FIG. 1 is a legged mobile robot. Similar to a human being, the robot R has a body B0, a head B1 disposed above the body B0, right and left arms B2 which are provided respectively at an upper portion of the body B0 by extending from both sides thereof, right and left hands H provided at the respective end portion of the right and left arms B2, right and left legs B4 which are provided respectively at a lower portion of the body B0 by extending downward thereof.

The body B0 is composed of an upper portion and a lower portion which are joined vertically in such a way that the two portions can rotate relatively around the yaw axis. The head B1 can move, for example rotate around the yaw axis with respect to the body B0.

The arm B2 is provided with a first arm link B22 and a second arm link B24. The body B0 and the first arm link B22 are joined through a shoulder joint mechanism (first arm joint mechanism) B21. The first arm link B22 and the second arm link B24 are joined through an elbow joint mechanism (second arm joint mechanism) B23. The second arm link B24 and the hand H are joined through a wrist joint mechanism (third arm joint mechanism) B25. The shoulder joint mechanism B21 has degrees of rotation freedom around the roll axis, the pitch axis and the yaw axis. The elbow joint mechanism B23 has a degree of rotation freedom around the pitch axis. The wrist joint mechanism B25 has degrees of rotation freedom around the roll axis, the pitch axis and the yaw axis.

The leg B4 is provided with a first leg link B42, a second leg link B44 and a foot B5. The body B0 and the first leg link B42 are joined through a hip joint mechanism (first leg joint mechanism) B41. The first leg link B42 and the second leg link B44 are joined through a knee joint mechanism (second leg joint mechanism) B43. The second leg link B44 and the foot B5 are joined through an ankle joint (third leg joint mechanism) B45.

The hip joint mechanism B41 has degrees of rotation freedom around the roll axis, the pitch axis and the roll axis. The knee joint mechanism B43 has degrees of rotation freedom around the pitch axis. The ankle joint mechanism B45 has degrees of rotation freedom around the roll axis and the pitch axis. The hip joint mechanism B41, the knee joint mechanism B43 and the ankle joint mechanism B45 constitute a "leg joint mechanism group". The translation and the degree of rotation freedom for each joint mechanism included in the leg joint mechanism group may be changed where appropriate. It is acceptable to omit any one joint mechanism in the hip joint mechanism B41, the knee joint mechanism B43 and the ankle joint mechanism B45 and constitute the leg joint mechanism group with a combination of the remained two joint mechanisms. Moreover, when the leg B4 is provided with a second leg joint mechanism different from the knee joint, the leg joint mechanism group may be constituted by including the second leg joint mechanism. In order to relieve impact when landing on floor, the bottom of the foot B5 is disposed with an elastic element B52 as disclosed in Japan Patent Laid-Open No. 2001-129774.

The robot R is mounted with a plurality of internal state sensors $S_1$ for determining an internal state such as a position, a posture and the like of the robot R in global coordinate system. An encoder (not shown) which outputs signals in accordance with a flexion angle (joint angle) of each joint mechanism of the robot R, an inclination sensor which outputs signals in accordance with the posture (specified according to an azimuth angle and an elevation angle) of the body B0, a pressure sensor to determine distinction between landing on floor and elevated from floor of the foot B5, respectively, and the like are equivalent to the internal state sensors $S_1$. In addition, an imaging device which images the ambient of the robot R at an imaging coordinate and recognizes a position of the robot R in the global coordinate system by recognizing a position of a mark fixed in the global coordinate system on the basis of the imaging coordinate is also equivalent to the internal state sensors $S_1$.

For example, a pair of head cameras C1 mounted laterally in the head B1, such as CCD cameras, infrared cameras and the like, which can sense lights of various wave bands and photograph the front side of the robot R as a imaging range of the head cameras C1, may be adopted as the imaging device. Moreover, a waist camera (active sensor) C2 mounted in a lower portion of the front side of the body B0 for determining a position, direction and the like of an object by emitting near infrared rays toward the object in a lower front region of the robot R and detecting reflection rays reflected from the object may be adopted as the imaging device.

The robot R is mounted with an external state sensor $S_2$ for determining an external state such as a position of an object in the ambient of the robot R. The imaging device mentioned above is equivalent to the external state sensor $S_2$.

The robot R is provided with a computer which is a component of the control system 1 and a plurality of aforementioned actuators 2 for driving each of the plurality of joint mechanisms. By controlling operation of each of the actuators 2 according to control commands output from the control system 1 on the basis of the internal state and the external state of the robot R, the robot R can be controlled to act adaptively in various behaviors.

(Configuration of Control System)

Figure 2:
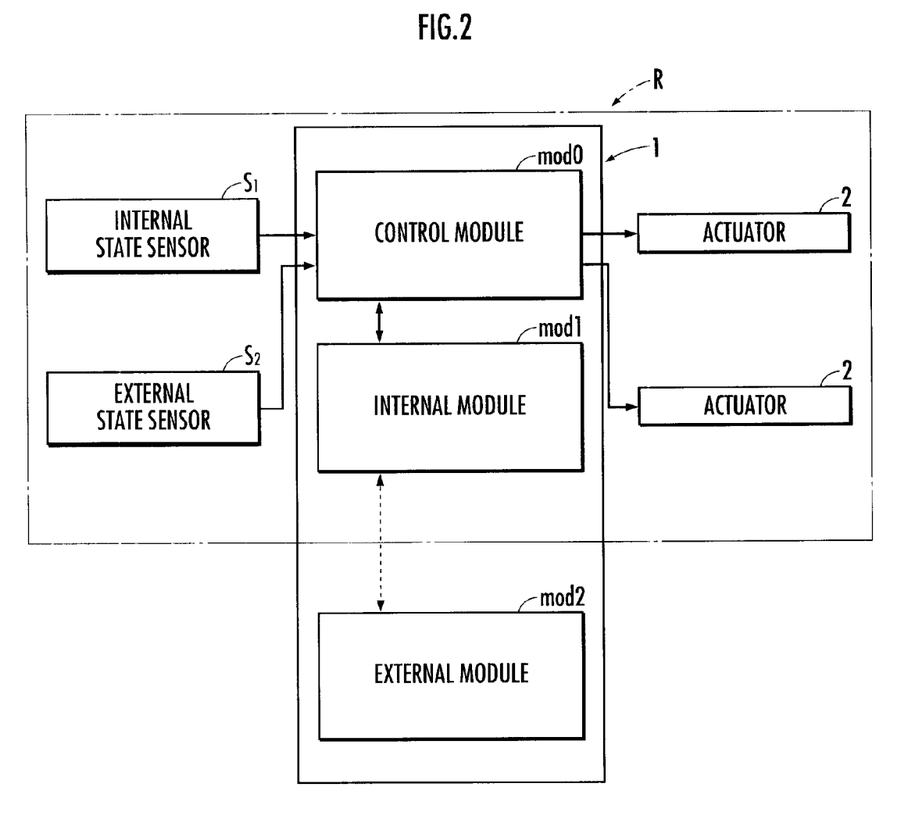
FIG. 2 is an explanatory view illustrating a configuration of a control system of the robot.

The control system 1 illustrated in FIG. 2 is provided with a control module mod0 and an internal module mod1 (internal array processor), and an external module mod2 (external array processor). The control module mod0 and the internal module mod1 are mounted in the robot R. The external module mod2 is composed of a computer cluster disposed outside the robot R.

The internal module mod1 is configured to repeat the generation of output signals by computing input signals every first computing cycle $T_1$. The external module mod2 is configured to repeat the generation of output signals by computing input signals every second computing cycle $T_2$ which is longer than the first computing cycle $T_1$ (for example, $T_2=4T_1$).

(Functions of Robot)

Functions of the robot R with the aforementioned configuration will be described.

(Fundamentals of control system)

The control system of the present invention is configured to solve the optimization problem on combinations of n numbers of continuous state variable values and m numbers of discrete state variable values denoting action behaviors of the robot R serving as the control subject. Specifically, among the combinations of n numbers of continuous state variable values $x=\{x_1, \ldots, x_n\}$ and m numbers of discrete state variable values $z=\{z_1, \ldots, z_m\}$, one combination having the optimal goodness of fit for a specified action objective of the robot R is determined as an action plan for the robot R. The approach is defined as the optimization problem on combinations of continuous values and discrete values, which is denoted by the equation (002)

$$\text{find}\{x^*, z^*\} = \text{argmax} f(x, z) \quad (002)$$

Wherein, "f" is a mapping function from the state variable space of the combination of the continuous values and the discrete values $\{x, z\} \in S$ to the Scalar space (1D space of real numbers) R (f: S→R) for evaluating the goodness of fit. "x*" and "z*" denote a combination of vectors x and z at which the goodness of fit is the optimal.

(Arithmetic Processing Sequence by Control System)

The operation of actuator 2 and the action of robot R are controlled by the control system 1 according to the following sequence.

First, measured values of state variables denoting the recent state measured value of the robot R are input into the control module mod0. Specifically, the internal state variable values of the position (landing position, ZMP position and the like), the posture (posture of the body B0) and the like in the global coordinate system of the robot R are recognized on the basis of the output signals from the internal state sensor $S_1$. The external state variable values of the size, the position in the global coordinate system and the like of an object in the ambient of the robot R are recognized on the basis of the output signals from the external state sensor $S_2$.

It is acceptable that the data denoting the external state such as the size, the position and the like of the object are input or transmitted from the outside of the robot R to the control system 1 and a part of or the entire part of the external state is recognized by the control module mod0.

Figure 3:
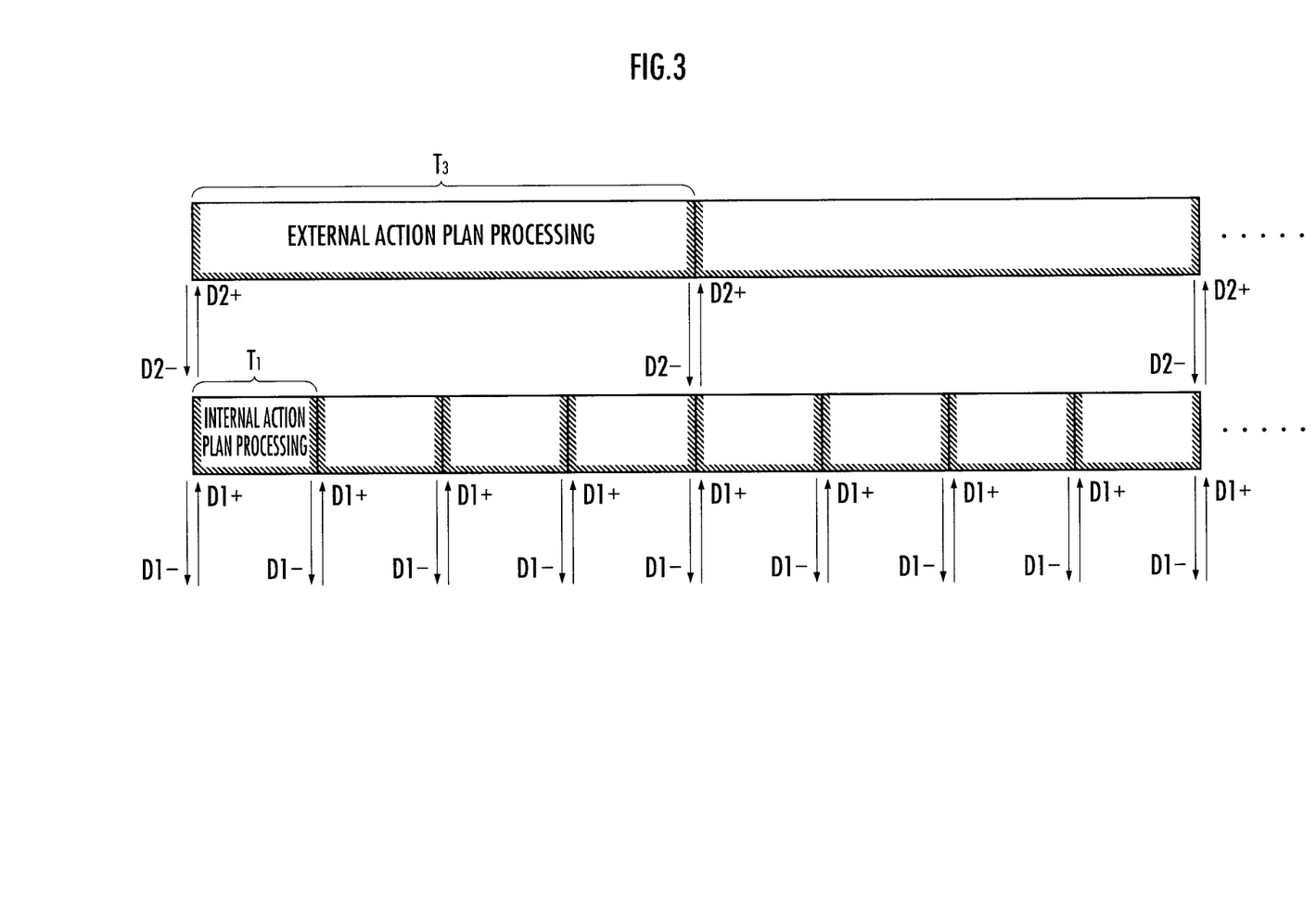
FIG. 3 is an explanatory view related to interaction of signals between modules.

The state variable values of the robot R are input from the control module mod0 to the internal module mod1 every first computing cycle $T_1$ (refer to the arrow $D_{1+}$ in FIG. 3). An external action plan acquired according to the execution of an external action plan processing is input from the external module mod2 to the internal module mod1 every second computing cycle $T_2$ (refer to the arrow $D_{2-}$ in FIG. 3).

According to the input signal, the internal module mod1 executes an internal action plan processing every first computing cycle $T_1$. The internal action plan acquired according to the execution of the internal action plan processing is input from the internal module mod1 to the control module mod0 every first computing cycle $T_1$ (refer to the arrow $D_{1-}$ in FIG. 3).

When there is no input signal from the external module mod2 at the initial time of the current time's cycle of the internal module mod1, the internal action plan processing is executed by using the input signal from the external module mod2 at the initial time of the latest previous cycle of the internal module mod1.

The latest state variable values or the most recent predicted state of the robot R in the latest future in accordance with the latest state variable value is input from the internal module mod1 to the external module mod2 every second computing cycle $T_2$ (refer to the arrow $D_{2+}$ in FIG. 3).

According to the input signal, the external action plan processing is executed by the external module mod2 every second computing cycle $T_2$. The external action plan acquired therefrom is input from the external module mod2 to the internal module mod1 every second computing cycle $T_2$ (refer to the arrow $D_{2-}$ in FIG. 3).

A command signal is sequentially generated by the control module mod0 according to the input signal from the internal module mod1 every first computing cycle $T_1$ (refer to the arrow $D_{1-}$ in FIG. 3). Thereafter, the command signal is transmitted from the control module mod0 to the actuator 2, the actuator 2 is driven according to the command signal, and consequently, the robot acts according to the most recent internal action plan.

(Contents of Each Action Plan Processing)

The details of the internal action plan processing executed by the internal module mod1 and the external action plan processing executed by the external module mod2 will be described.

(Sequence of External Action Plan Processing)

Figure 4:
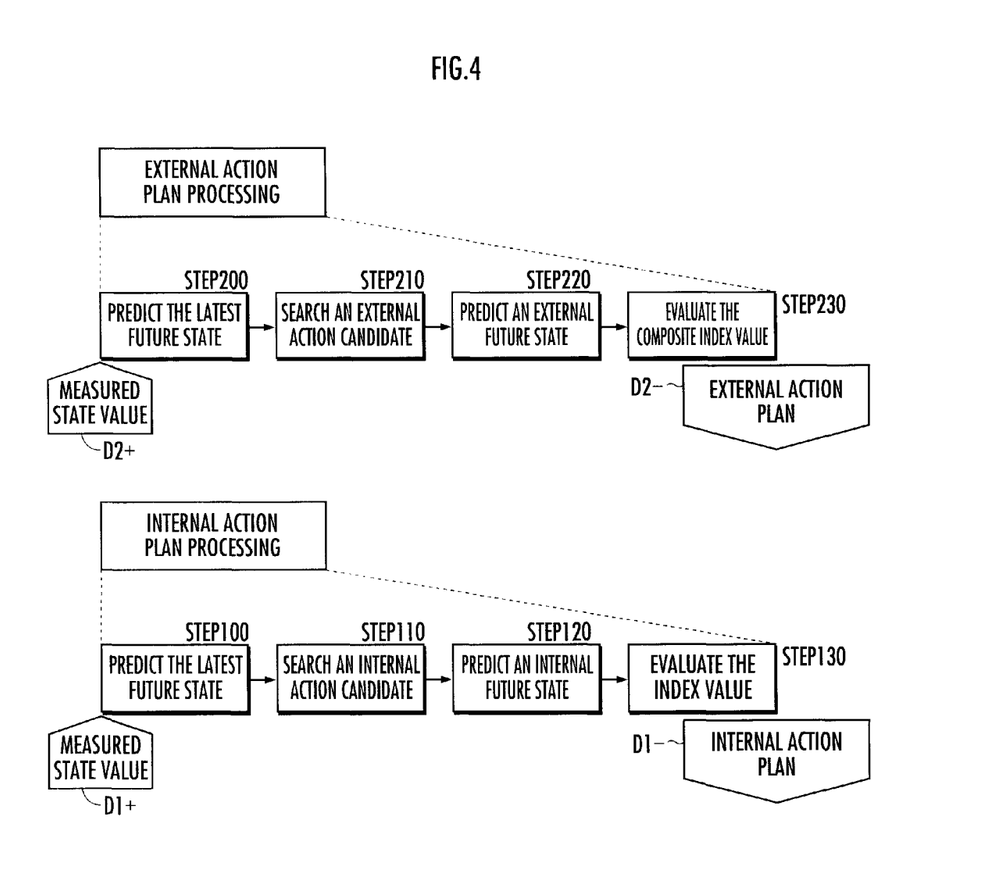
FIG. 4 is an explanatory view related to an array processing performed by each module.

The external module mod2 receives the latest measured state value from the internal module mod1 via wireless communication (refer to the arrow $D_{2+}$ in FIG. 4). On the basis of the latest measured state value, the latest future state of the robot R is predicted according to a behavior prediction model denoting behaviors of the robot R (FIG. 4/STEP 200). Accordingly, for example, a landing position advanced one step from the present position by the robot R is determined.

Figure 6:
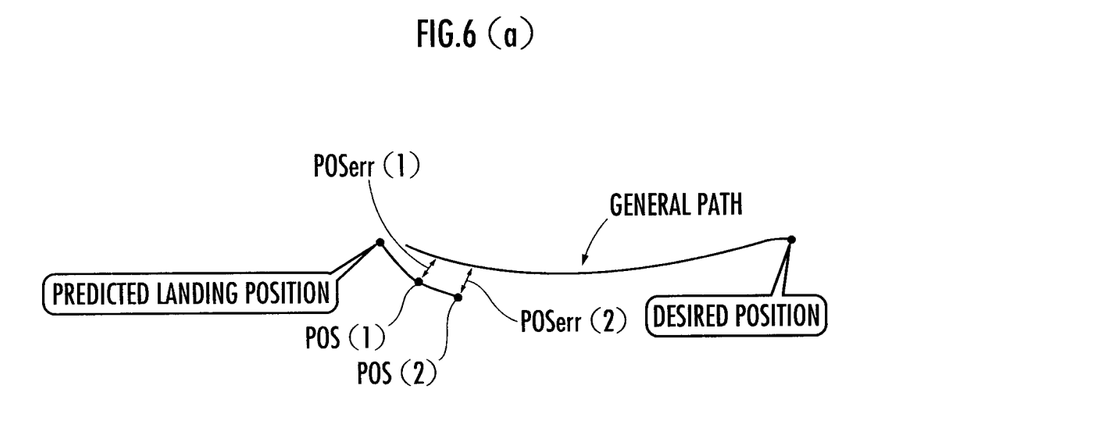
FIG. 6 is an explanatory view related to prediction of a future state.

The plural external action candidate $a_{i2}$ of the robot R is searched from the second search range (FIG. 4/STEP 210). The external action candidate $a_{i1}$ is the solution candidate $\{x, z\}$ of the aforementioned optimization problem. Accordingly, as illustrated in FIG. 6(a), a gait of the robot R from the predicted landing position of one step ahead of the robot R to the landing position pos ($a_{i2}$) over a specified number of footsteps q (for example, q=2) is searched as the external action candidate $a_{i2}$.

The gait refers to a pattern of repeated foot movements focused on the landing timing. The gait is denoted by a combination of the plural types of the unit action behaviors represented by the discrete variables, such as walking (W), running (R), one-foot spring (S) and the like, and the detailed contents of the unit action behaviors represented by the continuous variables, such as the landing position and the like.

Walking, running and one-foot spring are denoted by the values of the limited discrete state variables z=0, 1, 2, respectively, in a program. Meanwhile, the detailed content of the unit action behaviors such as the landing position and the like is denoted by the continuous state variable vector x, such as the coordinate values or the like of the landing position in a coordinate system such as the robot coordinate system, the global coordinate system or the like.

The types of the unit action behaviors may be denoted by a plurality of discrete state variable vector $z=\{z_1, \ldots, z_m\}$. For example, whether a floating period where all legs are floating in air is present or not may be denoted by "0" and "1" of a first discrete state variable $z_1$, and whether current time's supporting leg and next time's supporting leg are identical or not may be denoted by "0" and "1" of a second discrete state variable $z_2$. In this case, walking is denoted by the combination of two discrete state variables $(z_1, z_2) = (1, 1)$, running is denoted by the combination of two discrete state variables $(z_1, z_2) = (0, 1)$, and one-foot spring is denoted by the combination of two discrete state variables $(z_1, z_2) = (0, 0)$. The combination of two discrete state variables $(z_1, z_2) = (1, 0)$ denotes a motion in which the foot of the current time's supporting leg is maintained landing on floor and is used as the next time's supporting leg while the current time's free leg is used as the next time's free leg (for example, retry stepping).

Figure 5A:
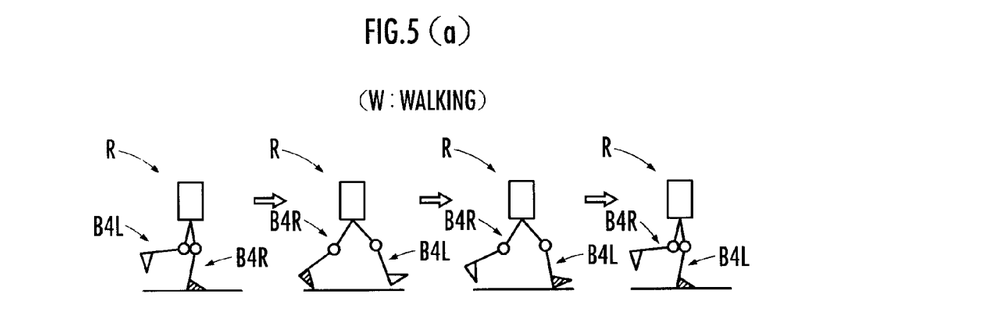
FIG. 5 is an explanatory view related to unit constituting element (action behavior) of a gait of the robot.
Figure 5B:
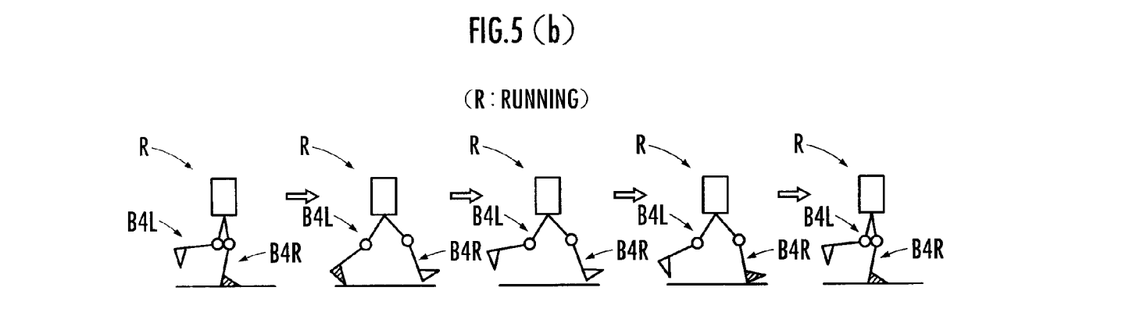
Figure 5C:
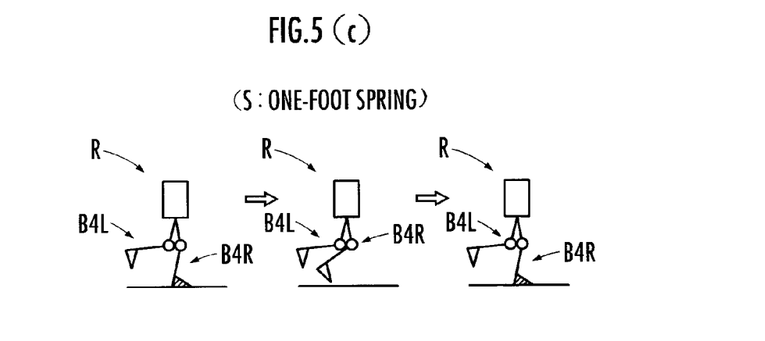

As illustrated in FIG. 5(a), walking serving as the unit action behavior refers to an action behavior in which the robot R translates only one step by alternating the current time's supporting leg (leg landing on floor) and the current time's free leg (leg elevated from floor) into the next time's free leg and the next time's supporting leg, respectively. In FIG. 5, an additional character "L" or "R" is added to the leg B4 to differentiate the leg is the left leg or the right leg. The floating period (in which all the legs are elevated from floor) is not included in walking.

Running serving as the unit action behavior refers to an action behavior in which the robot R translates only one step by alternating the current time's supporting leg (leg landing on floor) and the current time's free leg (leg elevated from floor) into the next time's free leg and the next time's supporting leg, respectively, after the floating period.

One-foot spring refers to an action behavior in which the robot R translates only one step by keeping the current time's supporting leg identical to the next time's supporting leg through the floating period.

The second search range includes the entire unit action behaviors executable in the specified footsteps q. For example, 9 patterns of (the unit action candidates defining the landing position pos($a_{i2}$, 1) of the first step and the unit action behaviors defining the landing position pos($a_{i2}$, 1) of the second step)=(W, W), (W, R), (W, S), (R, W), (R, R), (R, S), (S, W), (S, R) and (S, S) are defined as the second search range. The second search range is wider than a first search range to be described hereinafter.

Thereafter, on the basis of the external action candidate $a_{i2}$, a plurality of future state $s_{i2}$ of the robot R is predicted according to a state prediction model (FIG. 4/STEP 220). Accordingly, for example, ZMP (Zero Moment Point) of the robot R at the time when the robot R advances for the specified footsteps q from the predicted landing position of one step ahead of the robot R according to the external action candidate $a_{i2}$ is predicted as the future state $s_{i2}$. The future state $s_{i2}$ is denoted by the continuous state variable values.

Figure 7:
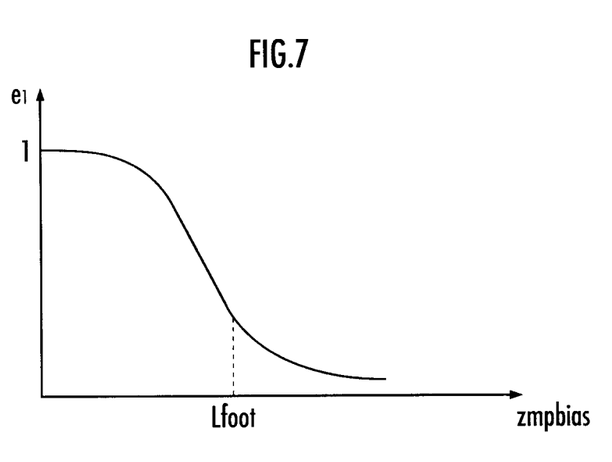
FIG. 7 is an explanatory view related to an evaluation approach for the goodness of fit.

Subsequently, the goodness of fit $e(a_{i2})$ denoting the fitness for the specified action objective is evaluated for each of the plural external action candidates $a_{i2}$ on the basis of the future state $s_{i2}$. The goodness of fit $e(a_{i2})$ may be, for example, calculated by the equation (210) on the basis of a bias $zmp_{bias}(a_{i2})$ between the predicted ZMP and the desired ZMP as illustrated in FIG. 6(b) and an interval $L_{foot}$ from the desired ZMP to the edge of the foot B5. The variation characteristics of the equation (210) are illustrated in FIG. 7. For example, the central position in a landing area of the foot B5 (a rectangular area, for example) is defined as the desired ZMP.

$$e(a_{i2})=\exp(-((zmp_{bias}(a_{i2})/L_{foot})^2) \qquad (210)$$

It is obvious from the equation (210) that the goodness of fit $e(a_{i2})$ is evaluated higher as the predicted ZMP of the robot R approaches to the desired ZMP thereof, that is, the external action candidate $a_{i2}$ having a higher possibility to stabilize the posture of the robot R is more approximated.

On the basis of the goodness of fit, the optimum solution $\{x^{}|z\}$ to the continuous variable vector is determined according to a search algorithm for each discrete variable value. In other words, the optimization problem on combinations of continuous values and discrete values is searched in parallel as the continuous value optimization problem of the number of possible combinations of the discrete variable values. Among the optimum solution $\{x^{}|z\}$ to the continuous variable vector in each of the combinations of the discrete variable values, a single external action candidate $a_{i2}^*=\{x^*, z^*\}$ having the best goodness of fit is determined as the external action plan. As another embodiment, it is acceptable to adopt every alternative approaches capable of searching the single combination of vectors x and z having the best goodness of fit. The external action plan is transmitted from the external module mod2 to the internal module mod1 via wire or wireless communication (refer to the arrow $D_{2-}$ in FIG. 4).

(Sequence of Internal Action Plan Processing)

The internal module mod1 receives the latest measured state value from the control module mod0 via an internal network of the robot R (refer to the arrow $D_{1+}$ in FIG. 4). On the basis of the latest measured state value, the latest future state of the robot R is predicted according to a behavior prediction model denoting behaviors of the robot R (FIG. 4/STEP 100). Accordingly, for example, a landing position advanced one step from the present position by the robot R is predicted.

The plural internal action candidate $a_{i1}$ of the robot R is searched from the first search range (FIG. 4/STEP 110). Similar to the external action candidate, the internal action candidate $a_{i1}$ can also be taken as the solution candidate $\{x, z\}$ of the aforementioned optimization problem. The internal module mod1, affected by the feedback of the external action plan $a_{i2}^*$ transmitted from the external module mod2, searches the first search range contained in the second search range at a relatively high speed. Accordingly, it is possible for the internal module mod1 to perform the high-frequency control while compensating prediction error or transmission delay from the external module mod2.

The first search range is a part of the unit action behaviors executable in the specified footsteps q. As illustrated in FIG. 6(a), the gait of the robot R from the predicted landing position of one step ahead of the robot R to the landing position pos($a_{i1}$, k) of the kth step over a specified number of footsteps q (for example, q=2) is searched as the internal action candidate $a_{i1}$. For example, (the unit action candidates defining the landing position pos($a_{i2}$, 1) of the first step and the unit action behaviors defining the landing position pos($a_{i2}$, 1) of the second step)=(W, W), (R, R) and (S, S) and the external action plan $a_{i2}^*$ are defined as the first search range. The first search range is smaller than the second search range.

Thereafter, on the basis of each of the plural internal action candidate $a_{i1}$, a plurality of future state $\{s_{i1}|=1, 2, \ldots, n\}$ of the robot R is predicted according to the state prediction model (FIG. 4/STEP 120). Accordingly, for example, the ZMP of the robot R at the time when the robot R advances for the specified footsteps q from the predicted landing position of one step ahead of the robot R according to the internal action candidate $a_{i1}$ is predicted as the future state $s_{i1}$. The future state $s_{i1}$ is denoted by the continuous state variable values. Herein, on the basis of the external action plan in addition to the predicted landing position of one step ahead of the robot R in accordance with the latest measured state value, the future state of the robot R is predicted according to the state prediction model. The predicted future state is denoted by the continuous state variable values.

Subsequently, the goodness of fit $e(a_{i1})$ denoting the fitness for the specified action objective is evaluated for each of the plural internal action candidate $a_{i1}$ on the basis of the future state $s_{i1}$ (FIG. 4/STEP 130). The goodness of fit $e(a_{i1})$ is calculated by the evaluation equation (110) similar to the evaluation equation employed by the external module mod2 (See equation (210)). Similarly, for the external action plan, the goodness of fit e denoting the fitness for the specified action objective is evaluated on the basis of the future state of the robot R represented by the latest measured state value.

$$e(a_{i1})=\exp(-((zmp_{bias}(a_{i1})/L_{foot})^2) \qquad (110)$$

Among the internal action candidate $a_{i1}$, a single internal action candidate $a_{i1}^*=\{x^*, z^*\}$ having the best goodness of fit $e(a_{i1})$ is determined as the internal action plan. The internal action plan is transmitted from the internal module mod1 to the control module mod0 via the internal network of the robot R (refer to the arrow $D_{1-}$ in FIG. 4). According thereto, the control module mod0 controls the operation of the actuator 2.

(Search Approach for Action Candidate According to Search Strategy)

Description will be carried out on the search approach for action candidate. An approach having convergence and diversity is adopted as the search approach. By the approach having convergence, an action candidate can be searched in the search range (a range in a space defined by the action candidates) close to the action candidate having a high previous time's evaluation so that the current time's evaluation will be higher. By the approach having diversity, an action candidate can be searched in a wide range so that the current time's evaluation will be higher instead of being excessively limited by the previous time's evaluation.

As a search approach having the convergence and diversity for searching the action candidate, an evolutionary search approach can be employed.

Figure 8:
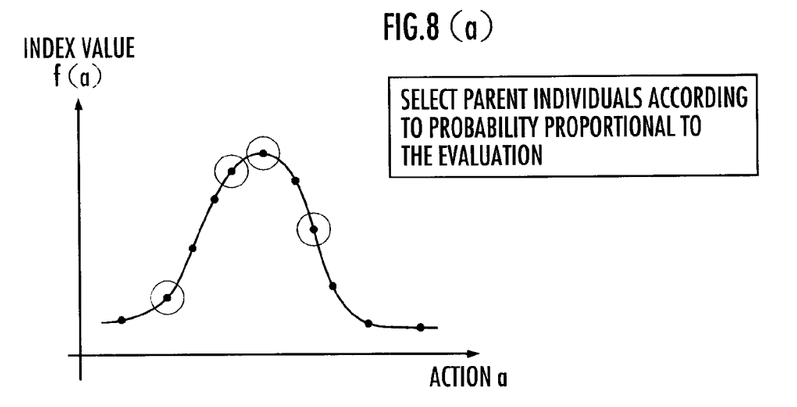
FIG. 8 is an explanatory view related to diversity and convergence in searching action candidates.

Specifically, at first, as illustrated in FIG. 8($a$), among a plurality of parent individuals (corresponding to the action candidates a, marked by "•"), the circled parent individuals are selected. The selection probability becomes higher as the goodness of fit f(a) (evaluated according to the evaluation curve drawn in solid line) becomes higher.

Thereby, as illustrated in FIG. 8($b$), the higher goodness of fit f(a) the parent individual has, the child individuals (marked by "○") will be generated so as to be distributed in a relatively smaller range around the parent individual at a higher probability as a result of adding a relatively smaller noise (noise decreases as the goodness of fit f(a) increases) to the parent individual. On the contrary, the lower goodness of fit f(a) the parent individual has, the child individuals (marked by "o") will be generated so as to be distributed in a relatively greater range around the parent individual at a lower probability as a result of adding a relatively greater noise (noise increases as the goodness of fit f(a) decreases) to the parent individual. In addition, irregular individuals (not shown) are generated. The rate of the irregular individuals in the entire individuals is set around 0.30, for example.

By employing the generation alternating approach mentioned above, the individuals are concentrated to a region with a higher goodness of fit f(a) over generations. Accordingly, an action candidate a having a higher goodness of fit to the main objective of the module can be acquired adaptively.

(Effects of the Robot R and the Control System of the Present Invention)

According to the robot R having the aforementioned functions, the internal module mod1 is configured to execute an array processing which searches an action plan for the control subject (the robot R) having the goodness of fit $e(a_{i1})$ for the specified action objective of each internal action candidate $a_{i1}$ from a plurality of internal action candidates $a_{i1}$ for the control subject denoted by one or a plurality of continuous state variable values and one or a plurality of discrete state variable values (refer to FIG. 4/STEP 100 to STEP 130). Meanwhile, the external module mod2 is configured to execute an array processing which searches an action plan for the control subject (robot R) having the goodness of fit $e(a_{i2})$ for the specified action objective of each external action candidate $a_{i2}$ from a plurality of external action candidates $a_{i2}$ for the control subject denoted by one or a plurality of continuous state variable values and one or a plurality of discrete state variable values (refer to FIG. 4/STEP 200 to STEP 230). Since not only the computing performance of the internal module mod1 but also the computing performance of the external module mod2 are employed, it can be expected to shorten the arithmetic computing time for determining the internal action plan (derivation of solutions).

The search range (second search range) for the low-frequency external module mod2 to search the external action candidate $a_{i2}$ is set wider than the search range (first search range) for the high-frequency (the computation cycle thereof is shorter than the external module mod2) internal module mod1 to search internal action candidate $a_{i1}$. As a result thereof, the external action plan $a_{i2}$ (for example, a landing position defined by the gait of 2 steps S→W) having the goodness of fit e for the specified action objective of stabilizing the posture of the robot R higher than the internal action plan $a_{i1}$ (for example, a landing position defined by the gait of 2 steps W→W, R→R or S→S) searched by the internal module mod 1 can be searched by the external module mod2.

Accordingly, as mentioned above, compared with the case where the internal action plan is determined as a solution by the internal module mod1 alone, the control subject can be controlled under the optimum behavior in consideration of the specified action objective while reducing the arithmetic computing time for deriving the solution.

On the other hand, the operation of robot R serving as the control subject can be controlled as long as the arithmetic computing result is acquired from the internal module mod1 (refer to the arrow $D_{1-}$ in FIG. 3). The search range (the first search range) for the high-frequency (the computation cycle thereof is shorter than the external module mod2) internal module mod1 to search the internal action candidate $a_{i1}$ is set smaller than the search range (the second search range) for the low-frequency external module mod2 to search the external action candidate $a_{i2}$, the arithmetic computing speed is accelerated accordingly. Thereby, when it is necessary for the robot R to cope with a disturbance emergently on the basis of the measured state values of the robot R (refer to the arrows $D_{1+}$ and $D_{2+}$ in FIG. 3), the operation of robot R can be controlled according to the arithmetic computing result from the high-frequency internal module mod 1 without waiting for the arithmetic computing result form the low-frequency external module mod2.

Thereby, it is possible to speed up the derivation of an internal action plan for the control subject as a solution to the optimization problem on the combinations of action candidates denoted by one or a plurality of continuous state variable values and one or a plurality of discrete state variable values. As a result thereof, the control subject can be controlled to act at an appropriate behavior for an arbitrary disturbance in consideration of the action objective of the control subject.

Figure 9:
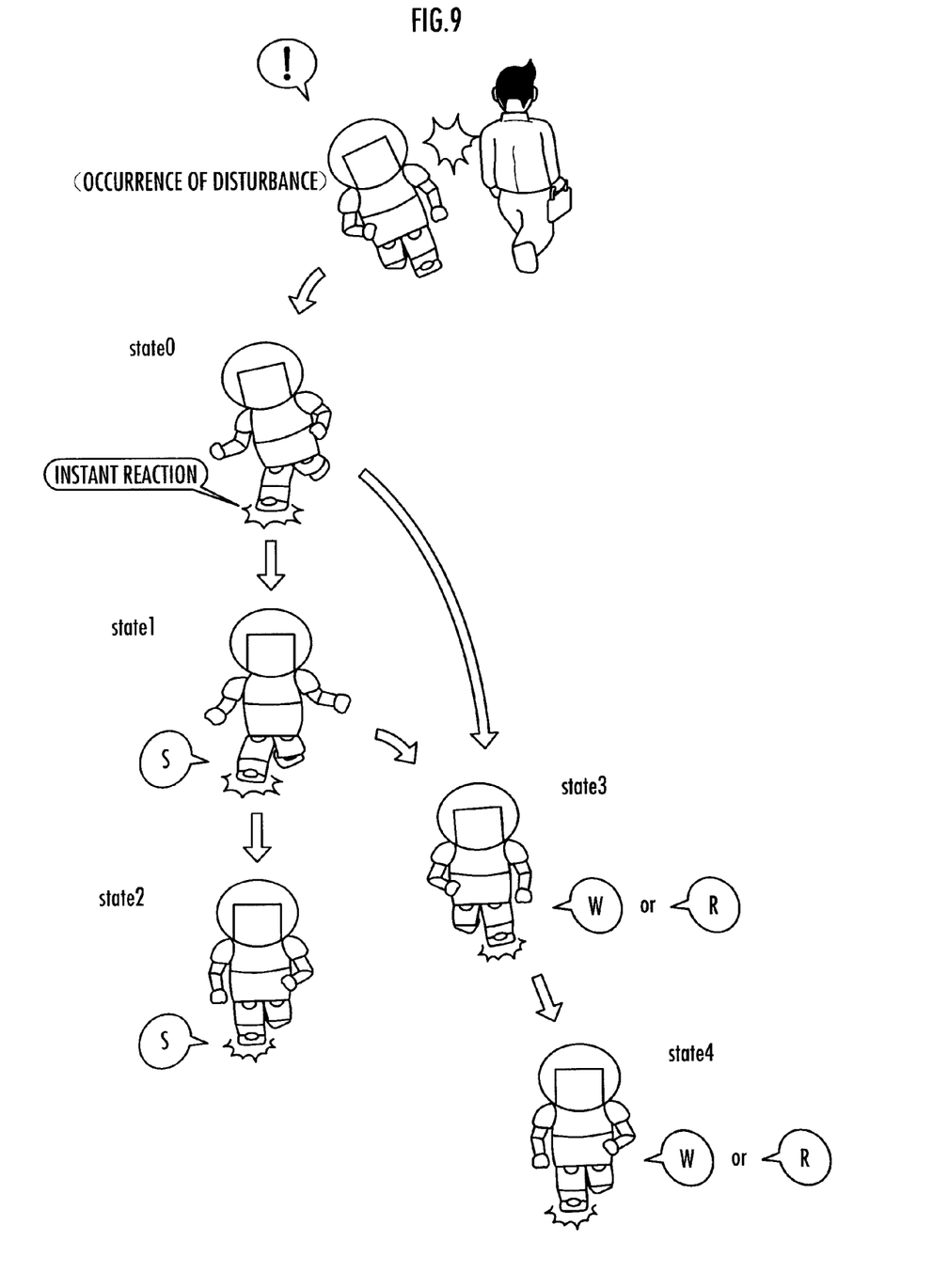
FIG. 9 is an explanatory view related to actions of the robot.

For example, after the disturbance illustrated in FIG. 9 is applied to the robot R, in an attempt to stabilizing the posture instantly, the robot R takes the reactions such as landing the free leg so as to support the self weight (refer to state 0) at first. Thereafter, the robot R continues to translate forward while attempting to stabilize the posture thereof according to the internal action plan which is a combination of unit action behaviors such as (S) one-foot spring (refer to state 1)→(S) one-foot spring (refer to state 2), (S) one-foot spring (refer to state 1)→(W) walking or (R) running (refer to state 3), or (W) walking or (R) running→(W) walking or (R) running (refer to state 4).

Other Embodiment of the Present Invention

In addition to the robot R (refer to FIG. 1), the control subject may be any apparatus such as a vehicle or the like as long as it is provided with an actuator as the power source, each of the plural types of unit action behaviors is denoted by a discrete state variable value and an action candidate resulted from a combination of the plural types of unit action behaviors is denoted by a continuous state variable value.

It is acceptable that the external module mod2 is configured to evaluate the sub goodness of fit $e_{sub}(a_{i2})$ for a sub action objective different from the specified action objective for each of the external action candidates $a_{i2}$, evaluate the composite goodness of fit $f(a_{i2})$ so that the contribution from the goodness of fit $e(a_{i2})$ (refer to the equation (210)) is higher than the contribution from the sub goodness of fit $e_{sub}(a_{i2})$, and determine the external action plan (refer to the arrow $D_{2+}$ in FIG. 4) according to the evaluation result of the composite goodness of fit $f(a_{i2})$.

In the embodiment, a general action objective that "the robot R arrives at the desired position" is employed as the sub action objective.

The sub goodness of fit $e_{sub}(a_{i2})$ is calculated according to the evaluation equation (120) based on the interval $pos_{err}(a_{i2}, k)$ from the landing position $pos(a_{i2}, k)$ to a general path having the desired position as the end point, and the footstep (maximum footstep) $L_{step}$ of the robot R.

$$e_{sub}(a_{i2}) = \Pi_{k=1-q} \exp(-pos_{err}(a_{i2}, k)/L_{step}) \quad (120)$$

It is obvious from the equation (120) that the sub goodness of fit $e_{sub}(a_{i2})$ is evaluated higher as the landing position $pos(a_{i2}, k)$ of the robot R approaches closer to the general path, that is, the external action candidate $a_{i2}$ predicted for the robot R to arrive at the desired position along the general path is more approximated.

On the basis of the goodness of fit $e(a_{i2})$ and the sub goodness of fit $e_{sub}(a_{i2})$, the composite goodness of fit $f(a_{i2})$ is evaluated according to the evaluation equation (141) or (142).

$$f(a_{i2}) = e(a_{i2})(e_{sub}(a_{i2})+1) \quad (141)$$

$$f(a_{i2}) = w_1 e(a_{i2})(w_2 e_{sub}(a_{i2})+1) \quad (142)$$

Wherein, $w_1 = (w_2+1)^{-1}$; $w_1$ and $w_2$ are weight factors.

A single external action candidate $a_{i2}$ having the best composite goodness of fit f is determined as the external action plan for the robot R.

According to the control system of the configuration mentioned above, the external module mod2 prioritizes the specified action objective (local action objective) in consideration of the other action objective (general action objective) to search the external action candidates for the robot R (refer to FIG. 8A and FIG. 8B). Moreover, for each of the external action candidates, the composite goodness of fit f is evaluated so that the contribution from the goodness of fit e for the specified action objective is higher than the contribution from the sub goodness of fit $e_{sub}$ for the other action objective (refer to the evaluation equations (141) and (142)).

Accordingly, when a disturbance occurs, only the specified action objective acquired from the arithmetic computing result (the internal action plan) by the internal module mod1 having a fast response is fed back to the action behavior of the robot R at the first stage, it is expected to reduce instantly the influence from the disturbance. After time passes, the other action objective in addition to the specified action objective acquired from the arithmetic computing result (the external action plan) by the external module mod2 having a slow response is fed back to the action behavior of the robot R, it is expected to recover the action behavior of the robot R so as to satisfy the entire objectives. Thereby, the robot R can be controlled to act at an appropriate behavior for an arbitrary disturbance in consideration of the action objective of the robot R.

What is claimed is:

1. A control system comprising a control module configured to control an actuator being a power source for driving a control subject, a high-frequency internal module mounted in the control subject, and a low-frequency external module disposed outside the control subject, wherein
the external module is configured to search at least one external action candidate, as an external action plan, from a plurality of external action candidates in a second search range on the basis of measured state values of the control subject, each of the external action candidates is a combination of unit action behaviors of the control subject, each of the unit action behaviors is denoted by one or a plurality of continuous state variable values and one or a plurality of discrete state variable values, the at least one external action candidate has a goodness of fit appropriate for a specified action objective of the external action candidates, the goodness of fit is a fitness for the specified action objective and is defined on the basis of a predicted state of the control subject denoted by the continuous state variable values;
the internal module is configured to search at least one internal action candidate, as an internal action plan, from a plurality of internal action candidates in a first search range on the basis of measured state values of the control subject, the first search range is defined smaller than the second search range, each of the internal action candidates is a combination of unit action behaviors of the control subject, the at least one internal action candidate has a goodness of fit appropriate for a specified action objective of the internal action candidates, the goodness of fit is a fitness for the specified action objective and is defined on the basis of the predicted state of the control subject denoted by the continuous state variable values; and
the control module is configured to control the operation of actuator according to the internal action plan determined by the internal module.

2. The control system according to claim 1, wherein the external module, in the determination of the external action plan denoted by the one or the plurality of continuous state variable values and one or the plurality of discrete state variable values, is configured to determine an optimum combination of the continuous state variable values with respect to the entire or partial discrete state variable values according to a search algorithm and adopt a combination of a discrete state variable value and a continuous state variable value having a highest goodness of fit from the optimum combination of the continuous state variable values with respect to the entire or partial discrete state variable values as the optimum action plan, the optimum combination of the continuous state variable values with respect to the entire or partial discrete state variable values is determined a combination that yields the highest goodness of fit.

3. The control system according to claim 1, wherein the external module is configured to
evaluate the sub goodness of fit for a sub action objective different from the specified action objective for each of the external action candidates,
evaluate the composite goodness of fit so that the contribution from the goodness of fit is higher than the contribution from the sub goodness of fit, and
determine the external action plan according to the evaluation result of the composite goodness of fit.

4. The control system according to claim 3, wherein the external module is configured to evaluate the composite goodness of fit $f_1$ for each of the external action candidates according to an evaluation expression $f=e(e_{sub}+1)$ or $f= w_1 e (w_2 e_{sub}+1)$ (herein, $w_1=(w_2+1)^{-1}$) based on the goodness of fit e and the sub goodness of fit $e_{sub}$.

5. The control system according to claim 1, wherein
the internal module and the external module are configured to search a gait of the control subject over a specified number of footsteps constituted by a specified combination of various types of the unit action behaviors as the internal action candidate and the external action candidate, respectively, and
the control subject is a robot configured to have a body and a plurality of legs extended from the body.

6. The control system according to claim 4, wherein the internal module and the external module are configured to evaluate the goodness of fit with an action objective of stabilizing a posture of the robot as the specified action objective, respectively.

7. A robot system, comprising a robot and a low-frequency external module disposed outside the robot,
the robot comprising: a body; a plurality of legs extended from the body the robot configured to move by the operation of the plurality of legs; and a control module configured to control an actuator being a power source for driving the robot and a high-frequency internal module mounted in the robot,
wherein
the external module is configured to search at least one external action candidate, as an external action plan, from a plurality of external action candidates in a second search range on the basis of measured state values of the robot, each of the external action candidates is a combination of unit action behaviors of the robot, each of the unit action behaviors is denoted by one or a plurality of continuous state variable values and one or a plurality of discrete state variable values, the at least one external action candidate has a goodness of fit appropriate for a specified action objective of the external action candidates, the goodness of fit is a fitness for the specified action objective and is defined on the basis of a predicted state of the robot denoted by the continuous state variable values;
the internal module is configured to search at least one internal action candidate, as an internal action plan, from a plurality of internal action candidates in a first search range on the basis of measured state values of the robot, the first search range is defined smaller than the second search range, each of the internal action candidates is a combination of the unit action behaviors of the robot, the at least one internal action candidate has a goodness of fit appropriate for a specified action objective of the internal action candidates, the goodness of fit is a fitness for the specified action objective and is defined on the basis of the predicted state of the robot denoted by the continuous state variable values;
the control module is configured to control the actuator according to the internal action plan determined by the internal module; and
each of the internal module and the external module are configured to search a gait of the robot over a specified number of footsteps constituted by a specified combination of various types of the unit action behaviors as the internal action candidate and the external action candidate.

8. The robot system according to claim 7, wherein each of the internal module and the external module is configured to evaluate the goodness of fit with an action objective of stabilizing a posture of the robot as the specified action objective.

* * * * *